358-69. OR 3,193,618 SR
T6532 SEARCH ROOM

CIRCUIT ARRANGEMENT IN A COLOR TELEVISION RECEIVER FOR CONVERTING THE RECEIVED AND DETECTED TELEVISION SIGNAL INTO A SIGNAL SUITABLE FOR APPLICATION TO A SINGLE-BEAM INDEXING TUBE

Filed July 19, 1962

INVENTOR
BERNARDUS H.J.CORNELISSEN
JAN DAVIDSE
BY
Frank R. Jifari
AGENT

United States Patent Office 3,193,618

Patented July 6, 1965

3,193,618
CIRCUIT ARRANGEMENT IN A COLOR TELEVISION RECEIVER FOR CONVERTING THE RECEIVED AND DETECTED TELEVISION SIGNAL INTO A SIGNAL SUITABLE FOR APPLICATION TO A SINGLE-BEAM INDEXING TUBE

Bernardus Henricus Jozef Cornelissen and Jan Davidse, Emmasingel, Eindhoven, Netherlands, assignors to North American Philips Company, Inc., New York, N.Y., a corporation of Delaware Filed July 19, 1962, Ser. No. 210,972
Claims priority, application Netherlands, Aug. 18, 1961, 268,427
5 Claims. (Cl. 178—5.4)

The invention relates to a color television receiver circuit for converting the received and once-detected color television signal into a signal which is suitable for being supplied to a control electrode of a single-beam indexing tube. The picture screen of the tube is constructed so that $\alpha$ times as many indexing strips are provided on it as groups of color strips. Run-in indexing strips are provided before the color strips on that side of the screen where the scanning of the color strips by the electron beam emitted by the gun is started. The mutual separation of the run-in strips differs from that of the actual indexing strips. The circuit comprises means for producing two signals during the scanning of the two types of indexing strips. One signal has the frequency $f_i$ which is determined by the rate at which the electron beam scans the actual indexing strips, and one signal has the frequency $f_h$ which is determined by the rate at which the electron beam scans the run-in indexing strips. Both signals are applied to a dividing stage and a number of mixer stages for converting the signal having the frequency $f_i$ into a signal having the frequency $$f_s=\frac{1}{\alpha}f_i$$

on which the color signals are modulated in the correct phase and which is suitable for being applied to a control electrode of the gun.

The use of an indexing tube having such a screen has the advantage that in spite of the use of only one electron gun which produces only one electron beam, cross-talk of the color signals on the indexing signal to be produced is avoided.

Since $\alpha$ times so many indexing strips as groups of color strips are available, the frequency $f_i$ of the indexing signal will be $\alpha$ times so large as the frequency $f_s$ of the signals on which the color signals have to be modulated for application to the cathode of the tube. A first requirement consequently is that the signal having the indexing frequency $f_i$ is converted into a signal having a frequency $$f_s=\frac{1}{\alpha}f_i$$

and then, or simultaneously, the color signals are modulated on this latter signal.

A second requirement is that in addition to the indexing signal having the frequency $f_i$ an auxiliary indexing signal having the frequency $f_h$ is produced for the conversion of the signal having the frequency $f_i$ into a signal having the frequency $f_s$ to be effected in the correct phase.

In principle, the conversion might also be effected without the use of such an auxiliary signal, since by frequency division and possibly later frequency multiplication, or conversely, the frequency $f_i$ can always be converted into a frequency $f_s$. When dividing circuits are used, it is never certain that the phase of the divided signal will be in agreement with the phase of the non-divided signal. However, if a signal having the frequency $f_h$ is available which is also derived from the screen of the indexing tube, the dividing stage may be started with it and in this manner it is ensured that the signal at the output of the dividing stage has the correct phase. This is very important since an incorrect phase would result in color distortion.

A third requirement is that in the case of variation of the frequency $f_i$ no errors of phase owing to delays occur in the circuit arrangement.

Finally, in connection with the above requirements during the conversion which is usually effected by means of mixer and/or modulation stages, the difficulty presents itself that the frequencies of some of the signals to be mixed are such that they themselves or their harmonics cannot be separated from the said signal frequencies by the use of filters.

It is possible to provide several solutions in which the above three requirements are satisfied and in which it is ensured that the undesired frequencies which may occur in the output signals of the mixer or modulation stages can be filtered in a simple manner, but the second arrangement according to the invention is to be considered a preferred embodiment which provides a simple and comparatively cheap solution with a minimum of mixer and modulation stages. In addition, the conversion is effected in a manner that, without the use of addition frequency multipliers, the frequencies supplied to the mixer or modulation stages are spaced so that only effects of the second order have to be compensated. This renders the construction of the mixer or modulation stages far less critical than in the case in which effects of the first order have to be compensated.

In order to realize all this, the circuit arrangement according to the invention is characterized in that the two signals having the frequencies $f_i$ and $f_h$ are supplied to a dividing stage which divides the signal having the frequency $f_i$ to a signal having the frequency $1/\beta f_i$. This latter signal is supplied to a first mixer stage, to which is also supplied the subcarrier wave having the frequency $f_r$ derived from the television signal received. In the output circuit of the first mixer stage a circuit is included which only passes a signal having the sum frequency $$\frac{1}{\beta}f_i+f_r$$

which is supplied to a second mixer stage. A signal of the frequency $f_i$ to the second mixer is also supplied. The output circuit of this second mixer stage is tuned to the difference frequency:

$$f_i-\left\{\frac{1}{\beta}f_i+f_r\right\}$$

The signal having this frequency is supplied to a third mixer stage. The color signal modulated on the subcarrier wave (which is suppressed) is also applied to the third mixer state. The output circuit of the third mixer stage is tuned to the sum frequency:

$$\left(1-\frac{1}{\beta}\right)f_i$$

in which is should hold that $$\left(1-\frac{1}{\beta}\right)=\frac{1}{\alpha}$$

so that the output signal of the third mixer stage has the signal frequency $$f_s=\left(1-\frac{1}{\beta}\right)f_i$$

which is required for the ultimate supply to the gun of the indexing tube.

In order that the invention may readily be carried into effect, one embodiment thereof will now be described, by way of of example, with reference to the accompanying drawing, in which.

Figure 1:
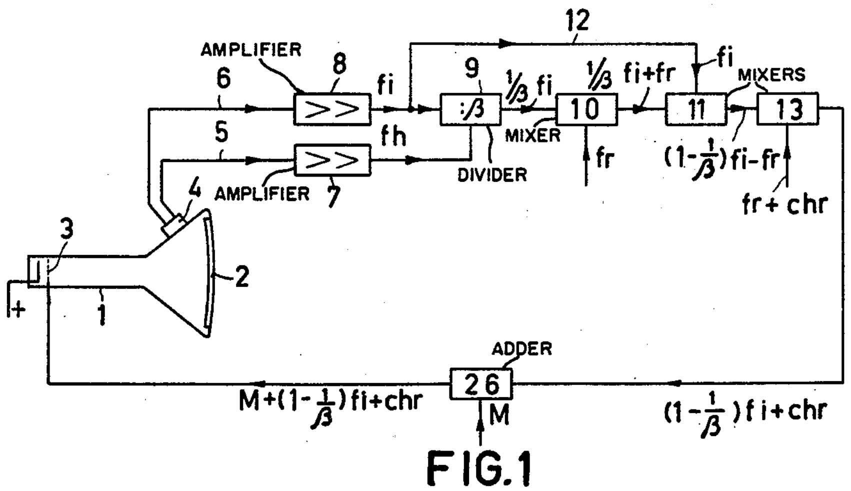
FIGURE 1 is a block diagram of the circuit according to the invention.

Referring now to FIGURE 1, reference numeral 1 is a single-gun indexing tube, the screen 2 of which is provided with color and indexing strips. As stated above, $\alpha$ times as many indexing strips are available as groups of color strips. For the present embodiment $\alpha$ is assumed to be $3/2$. Since each group of color strips consists of three strips, namely a red strip, a green strip and a blue strip, this means that an indexing strip is provided after every two color strips. If the frequency of the indexing signal is termed $f_i$ and that of the signal on which the color signals ultimately have to be modulated and which have to be supplied to the Wehnelt cylinder 3 of the tube 1 is termed $f_s$, then, in order to satisfy the first requirement stated in the introduction $$f_i=\alpha f_s=\frac{3}{2}f_s \qquad (1)$$

The signal having the frequency $f_s$ may be obtained from the signal having the frequency $f_i$ by means of frequency division. However, as explained above, a run-in indexing signal having the frequency $f_h$ has to be produced for this purpose.

This run-in indexing signal or auxiliary indexing signal is obtained by providing on that side of the screen where the horizontal scanning by the electron beam begins in a direction at right angles to the longitudinal direction of the indexing and color strips, a number of run-in indexing strips. The mutual separation of the run-in strips is different from that of the actual indexing strips which are provided together with the color strips. From this it follows that at the beginning of each horizontal scanning a signal is produced having the frequency $f_h$, where $$f_h=\frac{1}{\delta}f_s$$

and $\delta$ is an integer number. A photomultiplier 4 having two output terminals 5 and 6 is provided on the indexing tube. It has been assumed that both run-in indexing strips and actual indexing strips are composed of phosphors which emit ultra-violet light when they are struck by the electron beam. Therefore, the photo-multiplier 4 must be sensitive to ultra-violet light and, at the beginning of a horizontal scanning when the electron beam scans the run-in indexing strips, a signal having the frequency $f_h$ will appear at both output terminals 5 and 6. Only the amplifier 7, to the input terminal of which the output terminal 5 is connected, is tuned to the frequency $f_h$, so that only the amplifier 7 will pass this signal.

As soon as the scanning of the actual indexing strips begins, a signal having the indexing frequency $f_i$ is set up at both output terminals 5 and 6. Since only the amplifier 8, to the input terminal of which the output terminal 6 is conneced, is tuned to the frequency $f_i$, only the amplifier 8 will pass this signal. The part of the circuit arrangement described so far forms no part of the invention and is only given for a better understanding of the method for obtaining of the signals having the frequencies $f_i$ and $f_h$. Signals of these frequencies are required for a conversion according to the invention of the signal having the frequency $f_i$ into a signal having the frequency $f_s$. Therefore, for the invention it is irrelevant how these two signals are obtained. For example, instead of ultraviolet indexing strips, also interconnected indexing strips may be used having a secondary emission co-efficient. In that case the said interconnection should be coupled to the input terminals of the amplifiers 7 and 8.

The signals having the frequencies $f_i$ and $f_h$ are applied to a dividing stage 9. Once the dividing stage 9 has been started by the signal having the frequency $f_h$, it may be ensured, for example by internal feedback of the signal having the frequency $1/\beta f_i$ if $\beta/\delta=\alpha$, that the dividing stage 9 remains operative after the removal of the signal having the frequency $f_h$.

For convenience, numerical values used in an example of the circuit arrangement will be given below in order that the problems occurring and their solutions can better be understood. However, it will be clear that different numerical values may be chosen, provided that the ultimately obtained signal has a frequency $$f_s=\frac{1}{\alpha}f_i$$

and no errors of phase.

In the embodiment $$f_i=12 \text{ mc./s.}$$

$$f_h=4 \text{ mc./s.}$$

$$\alpha=3/2$$

$$\beta=3$$

so that $$f_t=\frac{1}{\alpha}f_i=8 \text{ mc./s.}$$

Therefore, at the output of the dividing stage 9, a signal appears having the frequency $$\frac{1}{\beta}f_i=4 \text{ mc./s.}$$

in the correct phase, and this signal is supplied to a first mixer stage 10. The signal having the frequency $f_r$, produced elsewhere in the color receiver, is also applied to the mixer 10. The frequency $f_r$ is the frequency of the color subcarrier wave which is also transmitted as a color reference signal together with the transmitted color television signal and occurs for a few cycles after the occurrence of each line synchronizing pulse. In the example, $f_r=4.5$ mc./s. and the mixer stage 10 is constructed so that its output signal contains only the sum of the frequencies of the signals supplied to it. Therefore, the frequency of the output signal of the mixer stage 10 equals $$\frac{1}{\beta}f_i+f_r=4 \text{ mc./s.}+4.5 \text{ mc./s.}=8.5 \text{ mc./s.} \qquad (2)$$

The output terminal of the first mixer stage 10 is connected to an input terminal of a second mixer stage 11. To a second input terminal of this mixer stage is also supplied, via the conductor 12, the indexing signal having the frequency $f_i$ obtained from the amplifier 8. The mixer stage 11 is constructed so that its output signal only contains the difference of the frequencies of the signals supplied to it. Therefore, the frequency of the output signal of the mixer stage 11 equals $$f_i-\left(\frac{1}{\beta}f_i+f_r\right)=\left(1-\frac{1}{\beta}\right)f_i-f_r=3.5 \text{ mc./s.} \qquad (3)$$

Finally, the circuit arrangement comprises a third mixer stage 13 to the first input terminal of which the output signal of the mixer stage 11 is supplied. In this latter mixer stage, the ultimate signal having the frequency $f_s$ must be obtained, and the color signals also must be modulated in this stage on the signal having the frequency $f_s$.

For this purpose, the signal $(f_r+chr)$ is supplied to the second input terminal of the mixer or modulation stage 13. This means that this is a signal in which the color signal, chroma, is modulated on the color subcarrier wave, which itself is suppressed, with a frequency of $f_r=4.5$ mc./s. In this case it is supposed that the signal $(f_r+chr)$ is a so-called symmetrical dot-sequential signal. Usually, the received and once-detected color signal is not in such a form that it can immediately be supplied to the mixer stage 13. Therefore, the once-detected color signal often is supplied to a device known per se which converts the color television signal received, for example that which is proposed by the National Television System Committee (N.T.S.C.) into a dot-sequential signal, which means that the various phase positions with which the colors red, green and blue are modulated on the subcarrier wave are converted into phase positions having a mutual difference of approximately 120° and amplitudes which are equal to ⅔R, ⅔G and ⅔B.

Naturally, this conversion may be omitted, but in that case a reproduction of the colors is obtained which is not quite natural. If this is thought to be sufficient, for example for cheaper receivers, the phase conversion device may be omitted and the once-detected color signal may be supplied directly to the third mixer stage 13.

In the output circuit of the mixer stage 13 a circuit is included which is tuned to the sum of the frequencies of the signals supplied to it. Consequently, the frequency of the output signal of the mixer stage 13 equals $$\left(1-\frac{1}{\beta}\right)f_i-f_r+(f_r+chr)=\left(1-\frac{1}{\beta}\right)f_i+chr=f_s+chr \qquad (4)$$

which shows the carrier wave $f_s$ modulated with color signals *chr* and having exactly the desired carrier frequency $f_s$=8 mc./s.

It will be clear that also figures other than those used may give the same results provided only that $$\frac{1}{\alpha}=\left(1-\frac{1}{\beta}\right)$$

So far it has been assumed that the frequencies $f_i$, $f_s$ and $f_h$ remain constant and consequently really are 12, 8 and 4 mc./s. respectively. Actually, however, the indexing system compensates for accelerations and delays during the scanning of the electron beams in the horizontal direction by varying the frequency $f_s$. This is accomplished since such accelerations and delays automatically result in variations in the frequences $f_i$ and $f_h$, from which frequencies the frequency $f_s$ is derived.

It will be clear that the circuit arrangement according to the invention only operates satisfactorily if also in the case of varying frequencies $f_i$, $f_h$ and $f_s$ the third requirement stated in the introduction is satisfied.

That this is actually the case may be proven as follows. Starting with the assumption that the frequency $f_i$ experiences a variation $\Delta f_i$ if the delay time in the amplifier 8 equals $\tau_1$ sec., the resulting phase error $\Delta\varphi_1$ in the output signal of the amplifier 8 will be equal to $$\Delta\varphi_1=\Delta\omega_i.\tau_1=\alpha.\Delta\omega_s.\tau_1=\frac{3}{2}\Delta\omega_s\tau_1$$

In the divider stage 9 not only the frequency but also the phase is divided by $\beta$ and, in connection with the fact that the signal having the frequency $f_h$ has a similar phase error as the signal having the frequency $f_i$, the phase error $\Delta\varphi_2$ in the output signal of this dividing stage becames equal to $$\Delta\varphi_2=\frac{1}{\beta}\Delta\varphi_1=\frac{\alpha}{\beta}\Delta\omega_s\tau_1=\frac{1}{2}\Delta\omega_s\tau_1$$

The dividing stage 9 will also introduce a certain delay but this may be included in the delay time $\tau_1$ as far as the delay of the signal for this dividing stage is concerned and in the delay time $\tau_2$ to be mentioned below in as far as the signal between this dividing stage and the mixer stage 11 is concerned.

As appears from the above, the signal is converted a few times into a different frequency between the output of the dividing stage 9 and the output of the mixer stage 13. In the mixer stage 10 this is done in order to add the reference signal having the frequency $f_r$. This is necessary to fix the phase position with respect to which the signal $(f_r+chr)$ to be added in the mixer stage 13 has to fix the color to be reproduced.

The frequency $f_r$ is to be considered as a constant frequency determined by the transmitter and will consequently introduce no additional phase error. Therefore, it is sufficient to calculate the phase error which occurs in the part of the circuit arrangement between the dividing stage 9 and the mixer stage 11 at the frequency $\alpha/\beta\ \Delta\omega_s$. If the delay time between the stages 9 and 11 is assumed to be $\tau_2$, the total phase error $\Delta\varphi_3$ at the input of the stage 11 is given by:

$$\Delta\varphi_3=\Delta\varphi_2+\frac{\alpha}{\beta}\Delta\omega_s\tau_2=\frac{\alpha}{\beta}\Delta\omega_s\tau_1+\frac{\alpha}{\beta}\Delta\omega_s\tau_2=\frac{1}{2}\Delta\omega_s(\tau_1+\tau_2)$$

In the stage 11, the difference frequency of the frequencies of the signals supplied is taken so that the phase error $\Delta\varphi_4$ at the output of the stage 11 is the difference of the phase errors of the signals supplied, from which it follows that:

$$\Delta\varphi_4=\Delta\varphi_1-\Delta\varphi_3=\alpha\Delta\omega_s\tau_1-\frac{\alpha}{\beta}\Delta\omega_s(\tau_1+\tau_2)$$

$$=\alpha\left(1-\frac{1}{\beta}\right)\Delta\omega_s\tau_1-\frac{\alpha}{\beta}\Delta\omega_s\tau_2$$

Finally, in the mixer stage 13 the signal $(f_r+chr)$ determined by the transmitter is supplied which consequently cannot introduce any phase error. If the delay of the mixer stage 11 is assumed to be included partially in the time $\tau_2$ and partially in the delay time $\tau_3$, which latter delay time relates to the frequency $$\alpha\left(1-\frac{1}{\beta}\right)f_s$$

the phase error $\Delta\varphi_5$ at the output of the stage 13 is found from:

$$\Delta\varphi_5=\Delta\varphi_4+\alpha\left(1-\frac{1}{\beta}\right)\Delta\omega_s\tau_3=\alpha\left(1-\frac{1}{\beta}\right)\Delta\omega_s(\tau_1+\tau_3-\frac{\alpha}{\beta}\Delta\omega^s\tau_2$$

Since no phase errors may occur, $\Delta\varphi_5$ must be 0, so that $$\Delta\omega_s\left(\alpha\left(1-\frac{1}{\beta}\right)(\tau_1+\tau_3)-\frac{\alpha}{\beta}\tau_2\right)=0$$

or $$\alpha\left(1-\frac{1}{\beta}\right)(\tau_1+\tau_3)=\frac{\alpha}{\beta}\tau_2 \qquad (5)$$

Since $$\frac{1}{\alpha}=\left(1-\frac{1}{\beta}\right)$$

this latter equation changes into $$(\tau_1+\tau_3)=\frac{\alpha}{\beta}\tau_2=\frac{1}{2}\tau_2 \qquad (5a)$$

By the choice determined according to the Equation *5a* of the delay times $\tau_1$, $\tau_2$ and $\tau_3$, it is possible to cause the phase error $\Delta\varphi_5$ at the output of the stage 13 to be zero, independently of the variation $\Delta f_i$ in the frequency $f_i$ which results in a variation $\Delta f_s$ in the frequency $f_s$.

Finally it should be investigated how in connection with the difficulty of filtering of adjacent frequencies in the output signals of the stages 10, 11 and 13, particularly the stages 10 and 13 have to be constructed. This can best be investigated with reference to the various frequencies which are supplied to the various stages and the frequencies which occur in the output signals thereof.

First of all the mixer stage 10. To this stage the frequencies $1/\beta f_i$=4 mc./s. and $f_r$=4.5 mc./s. are supplied. The output signal may contain only the sum frequency $1/\beta f_i+f_r$=8.5 mc./s. As is known, not only the desired mixed product will appear in the output signal of a normal mixer stage, but also the originally supplied signals and their higher harmonics. The original signals lie at 4 mc./s. and 4.5 mc./s., so that these could easily be filtered by a filter which must pass a signal of 8.5 mc./s.

However, the situation is quite different with the second harmonics which will have frequencies of 8 mc./s. and 9 mc./s. respectively. These are located close to either side of the desired frequency of 8.5 mc./s. so they cannot easily be filtered. This is of importance, especially since the frequency of 4 mc./s. of derived from the frequency $f_1$ which as a result of the accelerations and delays of the deflected electron beam, varies so that also the frequency of 4 mc./s. and consequently that of 8 mc./s. vary. From this it follows that the filter which has to pass the signal of 8.5 mc./s. must have a certain bandwidth so that it is substantially impossible to make a filter which has the required bandwidth for the frequency of 8.5 mc./s. and which has to cut off the frequency of 8 mc./s. (which also varies because it also originates from the frequency of 4 mc./s.) and that of 9 mc./s. It is noted that by the above choice of the frequencies supplied to the stage 10, only the second harmonics of the frequencies supplied can cause difficulties. This means that the mixer stage 10 must be constructed so that only an effect of the second order is compensated. As a result of this, fewer requirements are imposed on the mixer stage 10 than when an effect of the first order would have to be compensated, that is to say one of the frequencies supplied to the mixer stage lies near to the frequency of the mixed product.

Figure 2:
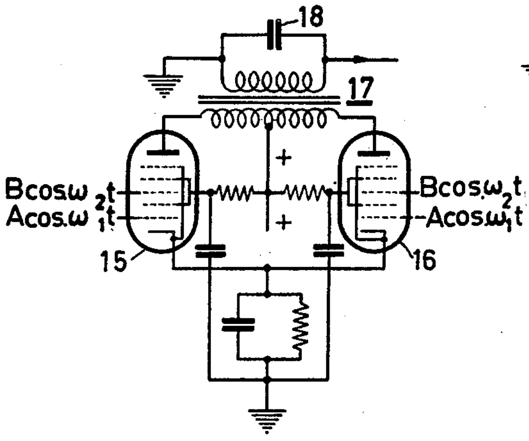
FIGURE 2 is a circuit diagram of mixer which may be used in the system of the invention.

A solution of the above problem is to construct the mixer stage 10 as a push-pull mixer stage. A possible embodiment of such a stage is shown in FIGURE 2. In this figure, the mixer stage 10 consists of two push-pull multiple grid tubes 15 and 16. To the two control grids of the tube 15 are supplied the signals $A \cos \omega_1 t$ and $B \cos \omega_2 t$ respectively, while to the two control grids of the tube 16 are supplied the signals $-A \cos \omega_1 t$ and $+B \cos \omega_2 t$ respectively. The signal $B \cos \omega_2 t$ consequently is supplied to the two tubes in phase, the signal $A \cos \omega_1 t$ is supplied to the two tubes in opposite phase.

If the anode current of the tube 15 is termed $i_{a1}$ and that of the tube 16 as $i_{a2}$, the resulting current through the primary of the transformer 17 equals $i_{a1}-i_{a2}$.

Parallel to the secondary of the transformer 17 a capacitor 18 is connected which together with this secondary constitutes a circuit which is tuned to $\omega_1+\omega_2$.

Although the tubes 15 and 16 are constructed as multiplicative mixer tubes, they may as well be additive mixer tubes. For the explanation of the fact that in spite of the fact that the annular frequencies $\omega_1$ and $\omega_2$ are close to one another their higher harmonics do all the same not occur in the output signal, the additive mixing method may best be used. For the anode current $i_{a1}$ of the tube 15 the power series may be written $$i_{a1}=\alpha+\beta Vg_1+\gamma Vg_1^2+\delta Vg_1^3 \quad (6)$$

and for the anode current $i_{a2}$ of the tube 16 the power series $$i_{a2}=\alpha+\beta Vg_2+\gamma Vg_2^2+\delta Vg_2^3 \quad (7)$$

may be written. Now $Vg_1=A \cos \omega_1 t+B \cos \omega_2 t$ and $$Vg_2=-A \cos \omega_1 t+B \cos \omega_2 t$$

If this is filled up introduced in the Equations 6 and 7 and elaborated, the resulting anode current $$i_{at}=ia_i-i_{a2}=\left(2\beta A+\frac{3\delta A^3}{2}+3\epsilon AB^2\right).\cos \omega_1 t$$
$$+2\gamma AB \cos(\omega_1-\omega_2)t+\frac{\delta A^3}{2}\cos 3\omega_1 t+\frac{3}{2}\delta AB^2 \cos(\omega_1+2\omega_2)t$$
$$+\frac{3}{2}\delta AB^2 \cos(2\omega_2-\omega_1)t+2\gamma AB \cos(\omega_1+\omega_2)t \quad (8)$$

In the above calculation it is assumed that the tubes 15 and 16 are balanced, that is to say that the coefficients of $\alpha$, $\beta$, $\gamma$ and $\delta$ occurring in the power series (6) and (7) have the same values in both series. Actually, such an ideal condition will never be obtained. If the frequencies of the signals supplied to the mixer stage 10 were chosen so that these frequencies were near to the desired frequency in the output signal of the mixer stage 10, the coefficients $\beta$ of both power series had to be equal to one another as well as possible to ensure that the supplied frequencies could not reach the output signal. It appears from Formula 8, for example, that the signal having the angular frequency $\omega_2$ does not occur in the output signal. If the $\beta$'s were not equal to one another, however, this signal would penetrate with a coefficient which would be proportional to the difference of the two $\beta$'s.

The same holds if the second harmonics of the supplied signals may not penetrate into the output signal since in that case the $\gamma$'s of the two power series (6) and (7) have to be equal to one another. However, it holds that $\beta>\gamma$, so that an error as a result of non-ideal balancing is always more strongly noticeable for the first (effect of the first order) than for the second (effect of the second order) harmonics. The balancing of the mixer stage for compensating an effect of the second order consequently always is less critical than for compensating an effect of the first order.

As appears from the Equation 8, the second harmonics no longer occur in the output signal. Since, however, especially the angular frequency $\omega_1$ still occurs in the resulting anode current $i_{at}$ and this frequency has to be removed by filtering, $\omega_1=2\pi f_r$ can best be chosen, in which $f_r$ is 4.5 mc./s., since this is a constant frequency, while the signal having the frequency $1/\beta f_1=4$ mc./s. varies in frequency. From this it follows that the angular frequency $\omega_2$ is given by $$\omega_2=2\pi\frac{1}{\beta}f_i$$

After introducing these data in the Equation 8 it appears that the frequencies occurring in the resulting anode current $i_{at}$ are $\omega_1=4.5$ mc./c.; $(\omega_1-\omega_2)=0.5$ ms./s.; $3\omega_1=13.5$ mc./s.; $(\omega_1+2\omega_2)=12.5$ mc./s.; $(2\omega_2-\omega_1)=3.5$ mc./s.; and $(\omega_1+\omega_2)=8.5$ mc./s.

Since the circuit constituted by the secondary of the transformer 17 and capacitor 18 is tuned to 8.5 mc./s. it is amply ensured that this frequency is passed and the remaining frequencies occurring in the anode current $i_{at}$ are not passed. In principle $\omega_1$ might also be $2\pi 1/\beta f_1$ and $\omega_2$ might also be $2\pi f_r$.

For the mixer stage 11 no separate measures need be taken, since the frequencies of 8.5 mc./s. and 12 mc./s. supplied to it deviate so much from the frequency of 3.5 mc./s. to which the output circuit of the stage 11 is tuned that no danger exists that they themselves or their harmonics can pass this output circuit.

Also in the mixer stage 13 only effects of the second order need be compensated. For, to this stage are supplied signals having the frequency $$\left(1-\frac{1}{\beta}\right)f_i-f_r=3.5 \text{ mc./s.}$$

and the modulated color signal $(f_r+chr)$ having the frequency $f_r=4.5$ mc./s. which as a result of the modulation of the color signals covers a bandwidth of approximately 3 mc./s. to 6 mc./s. By constructing the mixer stage 13 in the same manner as the mixer stage 10 and choosing for the signal having the angular frequency $\omega_2$ and the signal $(f_r+chr)$ and for the signal having the angular frequency $\omega_1$ that having the frequency $$\left\{\left(1-\frac{1}{\beta}\right)f_i-f_r\right\}$$

it may be ensured that also for the mixer stage 13 the second harmonics of the signals supplied do not occur in the output signal of this stage.

Figure 3:
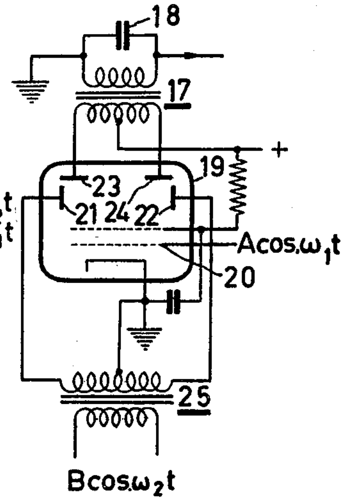
FIGURE 3 is a circuit diagram of a push-pull mixer stage or modulation stage which may be used in the first and third mixer stages of the block diagram of FIG. 1.

In addition to the push-pull stage shown in FIGURE 2, also other push-pull stages may be used for the end in view. For example, for this purpose a so-called "electron beam deflection tube" may be used as is shown in FIGURE 3. Such a tube has two deflection plates 21 and 22 and two anodes 23 and 24 in addition to the normal control grid 20. These anodes are connected together via the primary of the transformer 17, while the supply voltage is supplied to the centre tapping of this winding. The secondary of the transformer 17 with the capacitor 18 is again tuned to $\omega_1+\omega_2$.

The signal $A \cos \omega_1 t$ in this case is supplied to the control grid 20 in phase (only one signal) and the signal $B \cos \omega_2 t$ is supplied in opposite phase to the deflection plates 21 and 22 through the transformer 25. However, it is also possible to connect one of the deflection plates to earth and to supply the signal $B \cos \omega_2 t$ to the other deflection plate.

Finally it is also possible to use the known ring modulators having four diodes in the mixer stages 10 and 13.

It is noted that the signal having the frequency $$\left[\left(1-\frac{1}{\beta}\right)f_1+chr\right]$$

is supplied to an adding stage 26 to which also the monochromic signal M is supplied. This monochromic signal M will preferably be the converted luminance signal Y which after one detection and possibly filtering is derived from the television signal received. For cheaper receivers, this conversion may also be omitted, so that the luminance signal Y instead of the monochromic signal M is supplied to the adding stage 26.

The output terminal of the adding stage 26 is connected to the Wehnelt cylinder 3, so that in this manner the required control signal is supplied to the single gun of the indexing tube 1.

The adding stage 26 forms no part of the present invention.

What is claimed is:

1. Means for converting the subcarrier frequency of color television signals modulated on a subcarrier wave for a television receiver of the type having a single beam indexing tube with an electron gun for modulatng a scanning electron beam directed toward a screen, wherein said screen has a plurality of groups of parallel color strips, indexing strip means parallel with said color strips and within the area of said group, said receiver further comprising a source of a reference carrier of the frequency of said subcarrier wave, a source of said color television signals modulated on said subcarrier wave, and means for detecting the passage of said beam across said indexing strips to provide indexing signals, said means for converting the subcarrier frequency of said color television signals comprising frequency dividing means, means applying said indexing signals to said dividing means, first, second and third mixing means, means applying the output of said dividing means and said reference carrier to said first mixing means, means for applying said indexing signal and the sum output of said first mixing means to said second mixing means, means applying said color television signals modulated on said subcarrier means and the difference output of said second mixing means to said third mixing means, and means applying the sum output of said third mixing means to said electron gun, the dividing ratio of $\beta$ of said dividing means being determined by the expression:

$$\left(1-\frac{1}{\beta}\right)=\frac{1}{\alpha}$$

wherein $\alpha$ is the ratio of indexing strips to groups of color strips on said screen.

2. Means for converting the subcarrier frequency of color television signals modulated on a subcarrier wave for a television receiver of the type having a single beam indexing tube with an electron gun for modulating a scanning electron beam directed toward a screen, wherein said screen has a plurality of groups of parallel color strips, indexing strip means parallel with said color strips and within the area of said group, said receiver further comprising a source of a reference carrier of the frequency of said subcarrier wave, a source of said color television signals modulated on said subcarrier wave, and means for detecting the passage of said beam across said indexing strips to provide indexing signals, said means for converting the subcarrier frequency of said color television signals comprising frequency dividing means, means applying said indexing signals to said dividing means, first, second and third mixing means, means applying the output of said dividing means and said reference carrier to said first mixing means, means for applying said indexing signal and the sum output of said first mixing means to said second mixing means, means applying said color television signals modulated on said subcarrier waves with a suppressed subcarrier and the difference output of said second mixing means to said third mixing means, and means applying the sum output of said third mixing means to said electron gun, the delay times of said converting means being determined by the relationship:

$$t_1+t_3=\frac{\alpha}{\beta}t_2$$

wherein $t_1$ is the delay time of the converting means between the indexing tube and the output of the dividing means, $t_2$ is the delay time of the converting means from the output of the dividing means to the input of the second mixing means, $t_3$ is the delay time of the converting means between the output of the second mixing means and the electron gun of the indexing tube, $\alpha$ is the ratio of indexing strips to groups of color strips on said screen, and $\beta$ is the dividing ratio of said dividing means, and the dividing ratio is determined by the expression:

$$\left(1-\frac{1}{\beta}\right)=\frac{1}{\alpha}$$

3. The converting means of claim 2, in which at least one of said mixing means comprises a push-pull mixer having first and second pairs of inputs, wherein one signal applied thereto is applied to one pair of inputs in phase, and the other signal is applied to the other pair of inputs with opposite phases.

4. The converting means of claim 3, in which said push-pull mixer comprises a pair of electron discharge devices each having at least first and second grids and an anode, wherein said first grids are said first pair of inputs and said second grids are said second pair of inputs, comprising anode circuit means connected to said anodes for counteracting the anode currents of said discharge devices, said anode circuit comprising resonant means tuned to the sum frequency of the signals applied to said grids.

5. Means for converting the subcarrier frequency of color television signals modulated on a subcarrier wave for a television receiver of the type having a single beam indexing tube with an electron gun for modulating a scanning electron beam directed toward a screen, wherein said screen has a plurality of groups of parallel color strips, first indexing strip means parallel with said color strips and within the area of said group, and second indexing strips parallel with said color strips and located on the side of said area on which said beam starts each scanning line, said receiver further comprising a source of a reference carrier of the frequency of said subcarrier wave, a source of said color television signals modulated on said subcarrier wave, and means for detecting the passage of said beam across said first and second indexing strips to provide first and second indexing signals respectively of first and second frequencies respectively, said means for converting the subcarrier frequency of said color television signals comprising frequency dividing means, means for applying said first indexing signal to said dividing means for dividing said first indexing signal by a ratio $\beta$, means for applying said second indexing signal to said dividing means for controlling the phase of said dividing means, first, second and third mixing means, means applying the output of said dividing means and said reference carrier to said first mixing means, means for applying said indexing signal and the sum output of said first mixing means to said second mixing means, means applying said color television signals modulated on said subcarrier waves with a suppressed subcarrier and the difference output of said second mixing means to said third mixing means, and means applying the sum output of said third mixing means to said electron gun, the dividing ratio $\beta$ of said dividing means being determined by the expression:

$$\left(1-\frac{1}{\beta}\right)=\frac{1}{\alpha}$$

wherein $\alpha$ is the ratio of indexing strips to groups of color strips on said screen.

References Cited by the Examiner

UNITED STATES PATENTS

| | | | |
|---|---|---|---|
| 2,778,971 | 1/57 | Sunstein | 178—5.4 |
| 2,779,818 | 1/57 | Adler et al. | 178—5.4 |
| 2,945,087 | 7/60 | Graham et al. | 178—5.4 |
| 3,041,392 | 6/62 | Keiper et al. | 178—5.4 |

DAVID G. REDINBAUGH, *Primary Examiner.*

ROBERT SEGAL, *Examiner.*